(12) United States Patent
Huberman et al.

(10) Patent No.: US 8,301,582 B2
(45) Date of Patent: Oct. 30, 2012

(54) DYNAMIC CONSTRAINT SATISFACTION PROBLEM SOLVER WITH SUB-PROBLEM PLACEHOLDER

(75) Inventors: Steven A. Huberman, Carlisle, MA (US); Claire M. Bagley, Carlisle, MA (US); Martin P. Plotkin, Concord, MA (US); David J. Kulik, Carlisle, MA (US)

(73) Assignee: Oracle International Corporation, Redwood Shores, CA (US)

( * ) Notice: Subject to any disclaimer, the term of this patent is extended or adjusted under 35 U.S.C. 154(b) by 519 days.

(21) Appl. No.: 12/579,850

(22) Filed: Oct. 15, 2009

(65) Prior Publication Data
US 2011/0093421 A1 Apr. 21, 2011

(51) Int. Cl.
G06F 15/00 (2006.01)
G06F 15/18 (2006.01)

(52) U.S. Cl. ................ 706/62; 706/45; 706/47
(58) Field of Classification Search .............. None
See application file for complete search history.

(56) References Cited

U.S. PATENT DOCUMENTS

| | | | | |
|---|---|---|---|---|
| 5,452,238 A * | 9/1995 | Kramer et al. | | 703/1 |
| 5,636,328 A * | 6/1997 | Kautz et al. | | 706/45 |
| 6,336,110 B1 * | 1/2002 | Tamura et al. | | 706/46 |
| 6,430,573 B1 * | 8/2002 | Pachet et al. | | 1/1 |
| 7,069,537 B2 | 6/2006 | Lazarov | | |
| 7,333,968 B2 * | 2/2008 | Geller et al. | | 706/46 |
| 7,409,377 B2 | 8/2008 | Emek et al. | | |
| 2002/0107749 A1 | 8/2002 | Leslie et al. | | |
| 2002/0143653 A1 | 10/2002 | DiLena et al. | | |
| 2002/0166089 A1 | 11/2002 | Noy | | |
| 2004/0019852 A1 | 1/2004 | Purvis | | |
| 2005/0198621 A1 | 9/2005 | Tillmann et al. | | |
| 2005/0278271 A1 | 12/2005 | Anthony et al. | | |
| 2006/0064656 A1 * | 3/2006 | Lakshmanan et al. | | 716/5 |
| 2007/0094174 A1 * | 4/2007 | Hamadi et al. | | 706/19 |
| 2007/0094184 A1 * | 4/2007 | Emek et al. | | 706/45 |
| 2008/0288482 A1 | 11/2008 | Chaudhuri et al. | | |
| 2010/0268678 A1 * | 10/2010 | Chen et al. | | 706/46 |
| 2011/0022557 A1 * | 1/2011 | Bagley et al. | | 706/46 |

OTHER PUBLICATIONS

Sadeh et al. "Variable and value ordering heuristics for the job shop scheduling constraint satisfaction problem", Elsevier Science, 1996, 41 pages.*

Minton, "Automatically configuring constraint satisfaction programs: a case study", Kluwer Academic Publishers, 1996, pp. 7-43.*

Fruhwirth, Thom et al; "Principles of Constraint Systems and Constraint Solvers"; Archives of Control Sciences: Special Issue on Constraint Programming; 16(2); http://www.informatik.uniulm.de/pm/mitarbeiter/fruehwirth/Papers/ acssystems3.pdf; Feb. 01, 2005., 29 pp.. E.

(Continued)

*Primary Examiner* — Omar Fernandez Rivas
(74) *Attorney, Agent, or Firm* — Squire Sanders (US) LLP

(57) ABSTRACT

A dynamic constraint solver for solving a constraint satisfaction problem network that includes a plurality of nodes and a plurality of constraints determines a cardinality for a set of sub-problems. The cardinality is a numeric domain that represents the minimum number of instances in a port. The solver determines if a number of identifiable instances of sub-problems is less than the minimum number of instances. The solver then causes a user interface to display the identifiable instances and a placeholder for each instance that is below the minimum number of instances and is not identifiable.

20 Claims, 13 Drawing Sheets

OTHER PUBLICATIONS

Lhomme, Olivier; "Consistency Techniques for Numeric CSPS"; Proceedings in IJCAI-93; pp. 232-238; 1993; Chambery, France.

Selectica; "Selectica Configuration"; Solution Overview; 2005; Selectica, Inc.; San Jose, CA., 2 pages.

ILOG; "ILOG Configurator, Powering online product and service configuration applications"; Product Datasheet; Mar. 2005; ILOG.S. A., 3 pages.

ORACLE; "Oracle Configurator"; Oracle Data Sheet; www.oracle.com/us/products/applications/046986.pdf, 2008, 4 pages.

TACTON; "Tacton's Sales Configurator—Bridging the gap between engineering and sales for selling customized products"; http://www.tacton.com/tem plates/page_68.aspx?epslanguage=EN; 2007; Tacton Systems AB; Sweden; last downloaded May 22, 2008, 2 pages.

Benhamou, Frederick et al.; "Applying Interval Arithmetic to Real, Integer and Boolean Constraints"; Journal of Logic Programming. 32(1); 1997, 28 pages.

Sabin, Daniel et al.; "Configuration as Composite Constraint Satisfaction"; Proceedings of the (1st) Artificial Intelligence and Manufacturing Research Planning Workshop; 1996, 9 pages.

Junker, Ulrich et al.; "Preference programming: Advanced problem solving for configuration"; pp. 13-29; Oct. 13, 2002.

Narendra Jussien et al.; "Dynamic domain splitting for numeric CSPS"; pp. 225-227; 1998.

Fleischanderl, Gerhard et al.; "Configuring Large Systems Using Generative Constraint Satisfaction"; IEEE; pp. 59-68; No. 1094-7167/98; Jul./Aug. 2008.

Mittal, Sanjay et al.; "Dynamic Constraint Satisfaction Problems"; Proceedings of the Eighth National Conference on Artificial Intelligence; 1990 pp. 25-32.

Stumptner, Markus et al.; "Generative Constraint-Based Configuration of Large Technical Systems"; Artificial Intelligence for Engineering Design, analysis and Manufacturing; pp. 307-320; No. 12; Feb. 5, 1998; Cambridge University Press, USA.

Gelle, Esther et al.; "Solving Methods for Conditional Constraint Satisfaction"; IJCAL; 2003, 2 pages.

Junker, Ulrich;"QuickXplain: Conflict Detection for Arbitrary Constraint Propagation Algorithms"; ILOG; Valbonne, France; 2001, 8 pages.

* cited by examiner

Plan [1]
Show Legend

Plan Type    Shared
Minutes

Lines

| Name | Input Required | Configure | Copy | Remove | Delete |
|---|---|---|---|---|---|
| 1-716-354-2945 | | | | | |
| 1-914-493-4837 | | | | | 1010 |
| [To be Configured] | | | | | 1008 |
| Add Lines | 1012 | | | | | placeholder 1002

Number Of Lines  3
906
card == 3

☝an [1]
☐ Show Legend

Plan Type    Shared ▼
Minutes      ▼

Lines

| Name | Input Required | Configure | Copy | Remove | Delete |
|---|---|---|---|---|---|
| 1-716-354-2945 | | ▷ | 📋 | ↗ | 🗑 |
| [To be Configured] | | ▷ | | | 🗑 |
| Add Lines | | | | | | placeholder

Number Of Lines  (2)
                    min==max==2
                                906

DYNAMIC CONSTRAINT SATISFACTION PROBLEM SOLVER WITH SUB-PROBLEM PLACEHOLDER

FIELD

One embodiment is directed generally to a computer system, and in particular to a constraint based computer system that solves dynamic constraint satisfaction problems.

BACKGROUND INFORMATION

Many of the tasks that are addressed by decision-making systems and artificial intelligence systems can be represented as constraint satisfaction problems ("CSP"s). In this representation, the task is specified in terms of a set of variables, each of which can assume values in a given domain, and a set of constraints that the variables must simultaneously satisfy. The set of variables, domains and constraints is referred to as a CSP. Each constraint may be expressed as a relation, defined over some subset of the variables, denoting valid combinations of their values. A solution to a CSP is an assignment of a value to all the variables from their respective domains that satisfies all of the constraints.

A constraint based system includes a constraint solver that attempts to find one or more solutions to a given CSP, or prove that no solution exists. Constraint based systems are used for many artificial intelligence related applications and a variety of other applications, including: (1) Product configurators; (2) Robotic control; (3) Temporal reasoning; (4) Natural language processing; (5) Spatial reasoning; (6) Test-case generation for software and hardware systems; (7) Machine vision; (8) Medical diagnosis; (9) Resource allocation; and (10) Frequency allocation.

The network of constraints in a CSP can be viewed as a graph, having a node for each variable and an "arc" for each constraint. The members of each arc are the variables that appear in the constraint to which the arc corresponds. An arc is said to be consistent if for any variable of the arc, and any value in the domain of the variable, there is a valid assignment of values to the other variables on the arc that satisfies the constraint represented by the arc.

Classes of problems exist which are comprised of very large sets of variables that may only be conditionally related or required for a solution. One example of such problems is the configuration of large component-based systems. For example, selecting a type of hard disk controller for a computer configuration is not needed if a hard disk has not been chosen as a form of storage. If instead flash memory is chosen, a different set of variables and constraints would be required to be solved. Techniques have been developed to allow such large problems to be represented as a set of smaller sub-problems, conditionally related through composition or association. A "dynamic constraint satisfaction problem" is one in which these sub-problems of variables and constraints can be incrementally added as required, either explicitly or as a result of inference from the propagation of constraints.

SUMMARY

One embodiment is a dynamic constraint solver for solving a constraint satisfaction problem network that comprises a plurality of nodes and a plurality of constraints. The solver determines a cardinality for a set of sub-problems. The cardinality is a numeric domain that represents the minimum number of instances in a port. The solver determines if a number of identifiable instances of sub-problems is less than the minimum number of instances. The solver then causes a user interface to display the identifiable instances and a placeholder for each instance that is below the minimum number of instances and is not identifiable.

BRIEF DESCRIPTION OF THE DRAWINGS

FIG. 10 is a user interface in accordance with one embodiment used to configure the lines for the plan.

FIG. 12 is a user interface of a line configuration in accordance with one embodiment if the user accepts the override by clicking on "OK" in FIG. 11.

DETAILED DESCRIPTION

One embodiment is a dynamic constraint satisfaction problem solver that determines, in a partial solution, whether all sub-problems that are required by a cardinality have been configured or otherwise available. If not, a user interface displays a placeholder for each missing sub-problem so an interactive user knows that a new sub-problem should be configured.

Dynamic constraint problems can be described as a collection of sub-problems. In such a problem, a given sub-problem may be present or absent in the solution. If present, there may be one or more instances of the sub-problem in the solution. In the problem definition, the presence or absence of a sub-problem, the number of instances in the solution, and the characteristics of any instances that are present are all terms that may be the subject of constraints.

Additionally, a constraint problem with sub-problems may permit the connection of sub-problems with each other. The existence of a particular connection and the number and characteristics of connected instances are likewise terms that may be the subject of constraints.

When a constraint solver is used interactively, the solution is initially constrained only by the problem definition. As the user makes decisions about characteristics of the desired solution, the solver uses the problem constraints to infer other dependent characteristics. At most points during an interactive session, the solution is incomplete (i.e., the solver has inferred some characteristics but there are others that are not yet determined). The existence of a sub-problem or connection, the number of instances, and the identity or characteristics of any instances that are present or connected, are among the solution characteristics that may be undecided. In particular, the number of instances or connections known to be required may increase as the solution characteristics become more completely determined.

Within an interactive session, in one embodiment of the invention, the interactive user interface provides a clear understanding of the state of the incomplete solution. The user is also provided with an effective means to express decisions about solution characteristics. In particular, the user interface in accordance with one embodiment represents instances that are known to be required in the solution but whose identity or characteristics are not yet determined. Further, the user interface allows the user to indicate a desire to increase the required number of instances or connections, as opposed to specifying the identity or characteristics of an instance or connection that is already required. In contrast, known solvers display known and inferred instances or connections in an incomplete solution by displaying only those instances or connections that are explicitly created or selected by the user or displaying the required number of instances or connections numerically, while displaying fewer instances or connections explicitly.

Figure 1:
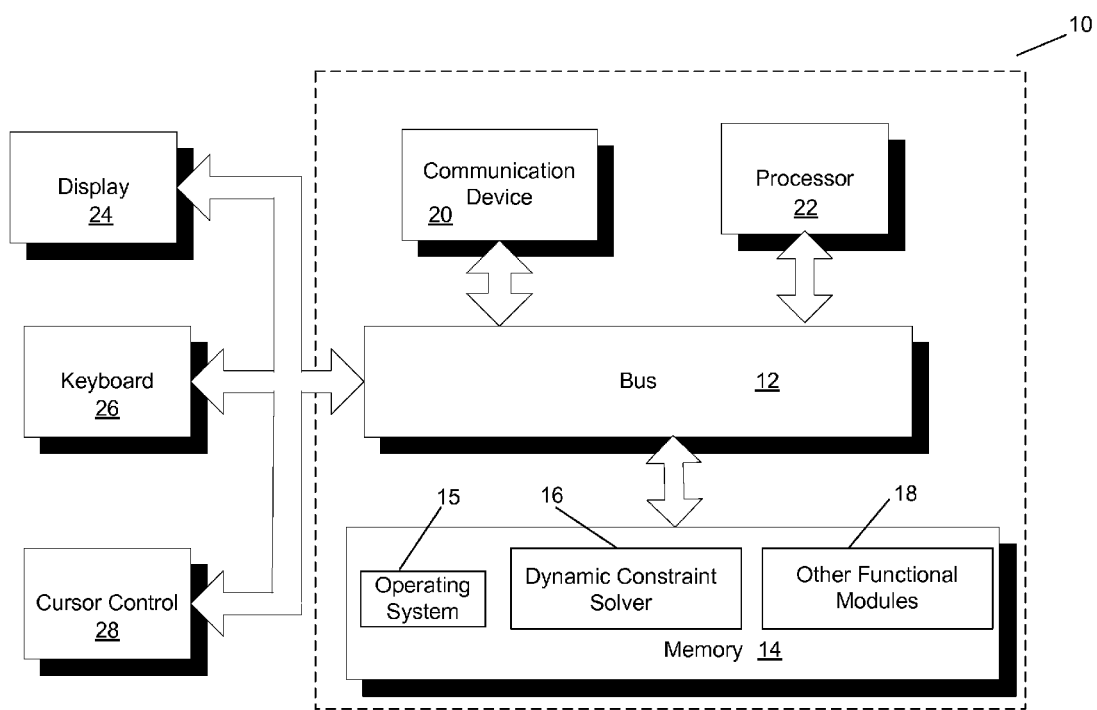
FIG. 1 is a block diagram of a dynamic constraint based system that can implement an embodiment of the present invention.

FIG. 1 is a block diagram of a dynamic constraint based system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a dynamic constraint solver module 16 that performs dynamic constraint solving and generates a user interface with placeholders for missing instances in a set as disclosed in more detail below. System 10 can be part of a larger system that includes a constraint solver, such as a product configurator or artificial intelligence system. Therefore, system 10 will typically include one or more additional functional modules 18 to include the additional functionality.

Figure 2:
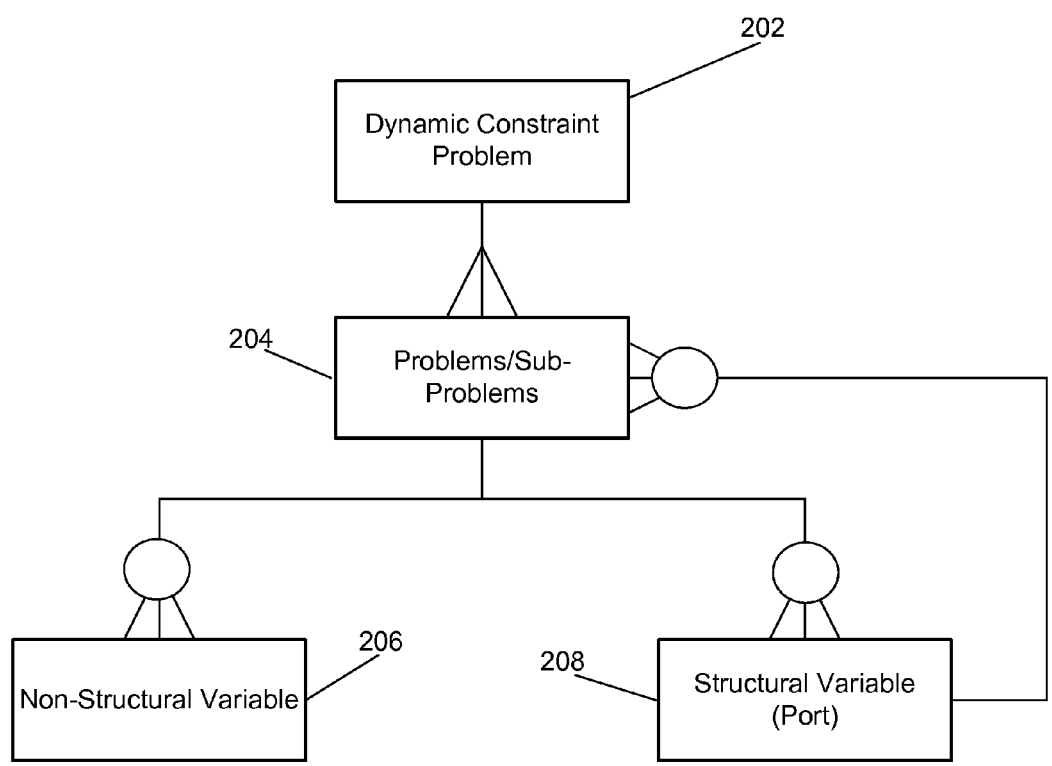
FIG. 2 illustrates an entity-relationship diagram of a dynamic constraint problem in accordance with one embodiment.

FIG. 2 illustrates an entity-relationship diagram of a model of a dynamic constraint problem 202 in accordance with one embodiment. Dynamic constraint problem 202 includes one or more problems or sub-problems 204 (a "sub-problem" may also be a "problem", and vice versa depending on where it falls in the hierarchy). In an embodiment where the dynamic constraint problem is for a product or service configurator, the problems/sub-problems are the components/sub-components of the configurator.

Each problem is formed of zero or more non-structural variables 206. Examples of non-structural variables 206 include Boolean variables, integer variables, floating point variables, etc. Each problem 204 may also include zero or more structural variables or "ports" 208. A port is a container for problems and connects sub-problems to the problem or to another sub-problem or acts as an extension point from one problem to another problem. Each port 208 can be connected to zero or more sub-problems 204. A port may be defined by two items: (a) the definition of the problem to be connected to the port; and (b) a numeric domain representing how many instances of the problem is required or allowed in the port (referred to as the port's "cardinality").

For example, a problem definition for Problem A may be as shown in Example 1 below (the bracketed information indicates the cardinality domain, or the domain of the number of instances allowed/required for the problem/port):

ProblemA
  |_Port to ProblemB [0..5]

EXAMPLE 1

As shown in the definition, Problem A includes a port to Problem B.

An example instance of Problem A is shown in Example 2 below:

ProblemA
  |_Port to ProblemB [1..5]
    |_ProblemB1

EXAMPLE 2

Initially, Problem A may include zero to five instances of Problem Bs through the port to Problem B. In the instance shown in Example 2, one Problem B (B1) has been coupled to the port to Problem B. Therefore, as shown, the cardinality domain for the port to Problem B is now [1..5].

Certain conditions in the problem state can lead to the association of "inferred" problems or sub-problems, also referred to as auto-containment ("AC") decisions. In general, inferred problem instances may be generated within an existing Problem A if the following condition is met: Problem A requires a certain number of Problem Bs to be associated within it and there are not enough existing available Problem Bs that can be associated with Problem A, or there are more existing and potential Problem Bs than are required by Problem A so it cannot be determined which Problem B to use. The following are three examples that illustrate the generation of an inferred problem:

(1) The user performs an action (a "user decision" or "UD"). After propagation of the consequences, an existing Problem A now requires one Problem B to be associated with it. There is no instance of Problem B. Therefore, a new instance of Problem B is generated and associated with Problem A through inference. The new instance of Product B is an inferred problem instance, and its association with the existing instance of Problem A is an inferred problem association or "AC decision".

(2) The user performs an action. After propagation of the consequences, an existing Problem A now requires one instance of Problem B to be associated with it. There is already an instance of Problem B. No inferred problem instance is generated, because the solver cannot rule out the possibility that this existing instance of Problem B may be associated with Problem A. No AC decision is generated, because the solver cannot decide whether this instance of Problem B or some other instance yet to be created will be associated with Problem A.

(3) An existing Problem A requires one Problem B to be associated with it. There is already an instance of Problem B, but this Problem B is not associated with Problem A yet (as in the previous example). Now the user performs an action. After propagation of the consequences, the solver determines that for some reason the existing instance of Problem B is not allowed to be associated with Problem A. A new instance of Problem B is then generated and associated with Problem A through inference.

Figure 3A:
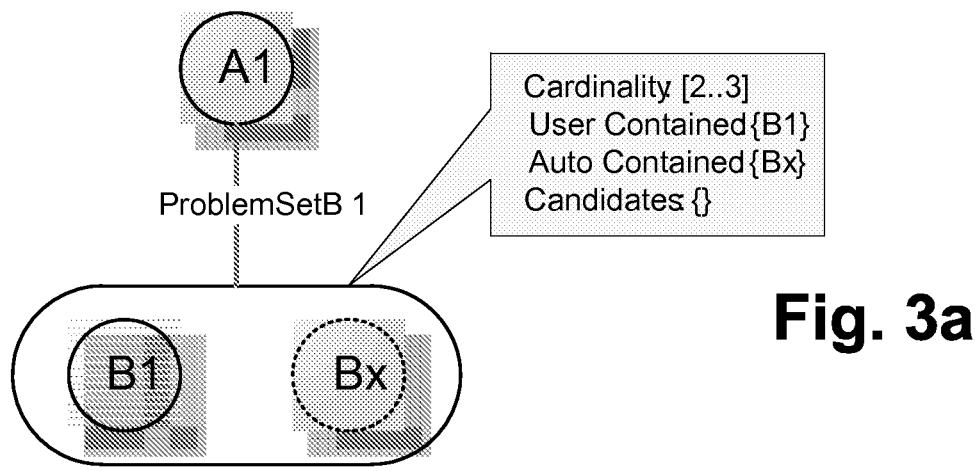
FIG. 3a illustrates one possible scenario where there is one instance of ProblemB generated in the system.

As an example of problems that exist in known solutions, refer again to Example 2 above where one instance of Problem/Component B is generated. FIG. 3a illustrates this scenario where there is one instance of ProblemB generated in the system and is referred to as "B1". Also assume that an inference happens, due to problem constraints and existing user choice propagation requiring ProblemSetB1 to contain at least 2 problems/components but no more than 3. "B1" is already included in ProblemSetB1 by the user. Since there are no other candidates (existing instances of ProblemB not already contained in ProblemSetB1), the only possible solution is to create and add a new generic ProblemB, "Bx" to the port. In this case, "Bx" is auto-contained and is not visually distinguishable from the user contained instance, B1.

Figure 3B:
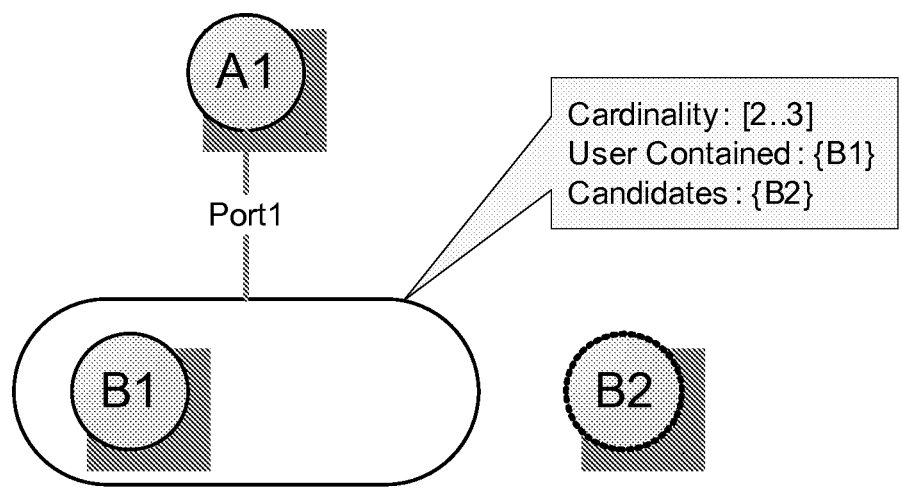
FIG. 3b illustrates another possible scenario where, unknown to the user, a configured candidate instance of ProblemB is available as a candidate.

FIG. 3b illustrates another possible scenario where, unknown to the user, a configured candidate instance, "B2", of ProblemB is available as a candidate when the inference described above happens. In this scenario, "Bx" will not be contained in the port because there are 2 possible choices: add a new generic instance, "Bx", or contain the candidate, "B2".

Known constraint systems, in adding new instances or connections, fail to distinguish between increasing the required number and identifying or specifying characteristics of an instance or connection whose existence has already been inferred.

Figure 4:
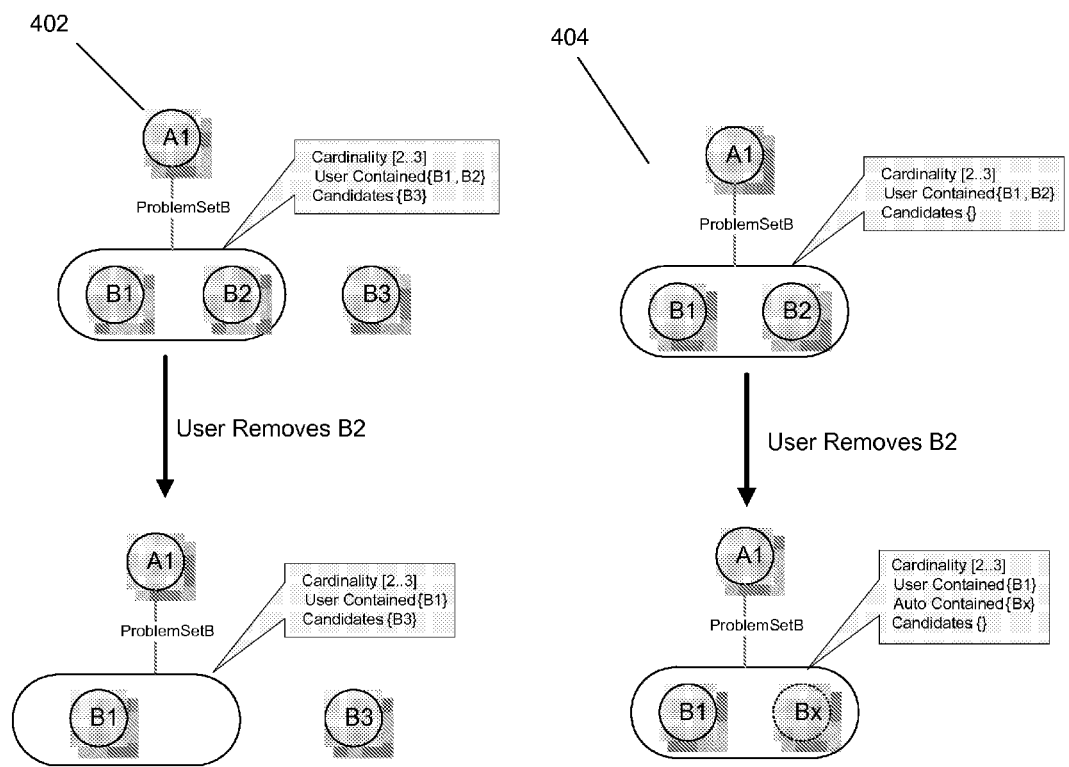
FIG. 4 illustrates an example in which the availability of a candidate can affect the apparent content of a set.

FIG. 4 illustrates an example in which the availability of a candidate can affect the apparent content of a set. When removing an instance from a set, path 402 shows the result of removing an instance from a set when there is a candidate available, while path 404 shows the result when no candidate is available. The resulting sets appear quite different. While this is correct, it can lead to confusion for the user in that sometimes removing an instance will result in a set with apparently one less instance, while at other times the set will contain the same number as before the remove operation. In both cases, the required minimum cardinality remains the same.

Figure 5:
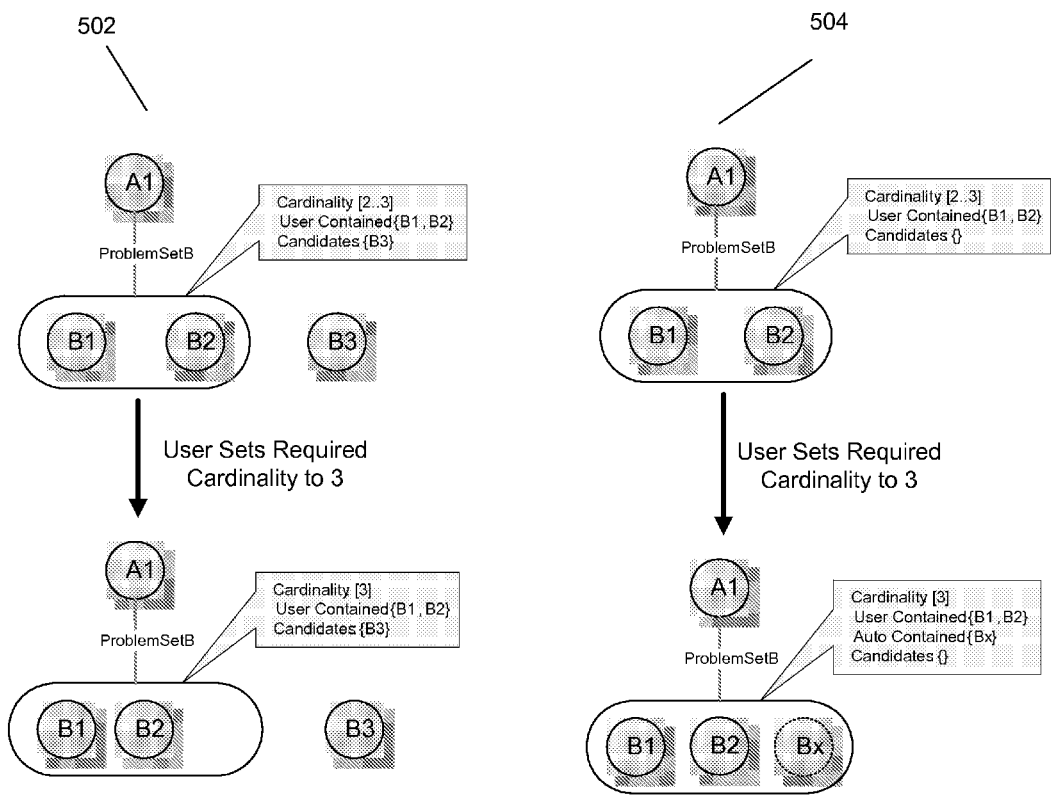
FIG. 5 illustrates an example of problems when increasing the minimum cardinality of a set.

FIG. 5 illustrates an example of problems when increasing the minimum cardinality of a set. Path 502 shows the result of setting the cardinality of the set to 3 when there is a candidate available, while path 504 shows the result when no candidate is available. In both cases, the cardinality of the set is equal to 3. As in the example of FIG. 4, the resulting sets appear quite different.

In accordance with one embodiment of the present invention, a user interface presents a sub-problem or connection as a table or other list-like construct. At every point during the interactive session, the table has as many rows as there are instances or connections known at that point to be required in the solution. New rows are added to the table whenever the solver is able to infer that the required number of instances or connections is greater than previously known. Instances or connections whose existence has been inferred but whose identity and characteristics have not yet been determined are represented as placeholder rows, while instances or connections with known identity or characteristics are represented as full-fledged instance or connection rows. This distinction is made in the user interface by using different visual representation of these two types of rows in the table.

Figure 6:
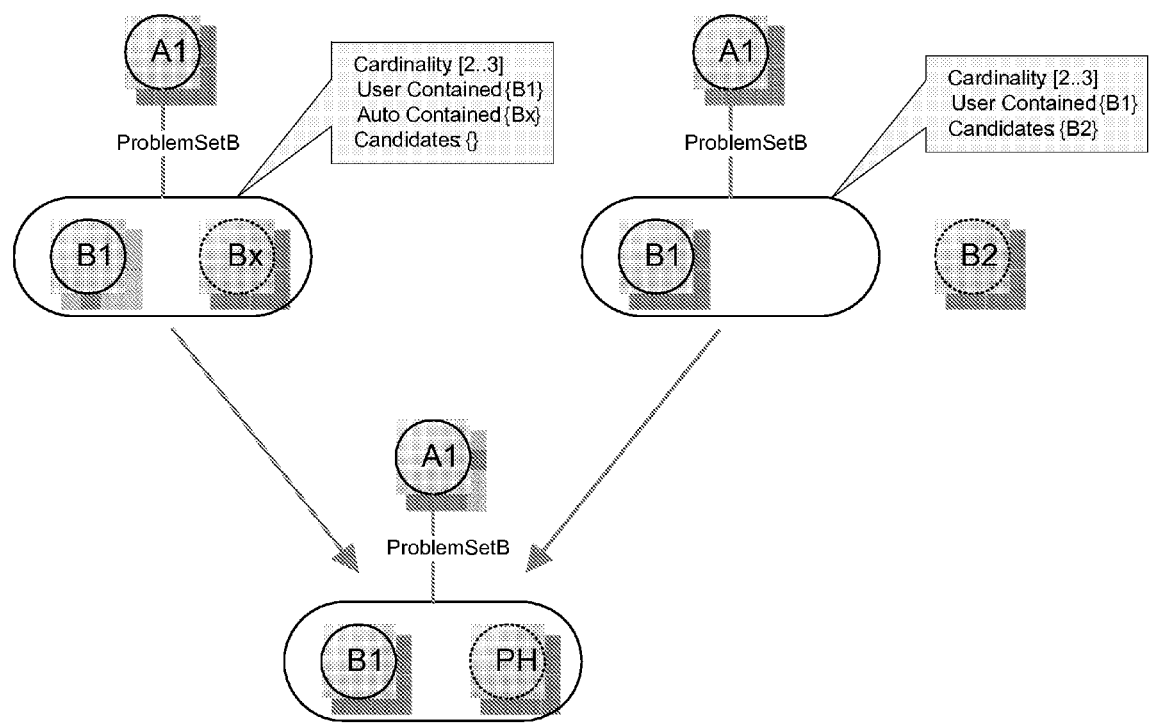
FIG. 6 illustrates how using a placeholder in accordance with one embodiment removes the ambiguity in the presentation of the minimum cardinality of a set that is present in the examples of FIGS. 4 and 5.

The user may specify the identity or characteristics of an inferred instance or connection by gesturing at the placeholder row, thus transforming the placeholder row into an identified instance or component and having an internally represented placeholder. A separate "Add Instance/Connection" command can be used to increase the required number of instances or connections, thereby visibly adding a new row to the table. FIG. 6 illustrates the use of an internally represented placeholder ("PH") in accordance with one embodiment that removes the ambiguity in the presentation (disclosed below) of the minimum cardinality of a set that is present in the examples of FIGS. 4 and 5.

In one embodiment, solver 16 of FIG. 1 is a product/service configurator that a user can interact with to configure a product such as a computer system or a service such as a mobile telephone service plan. A component instance in this embodiment is an occurrence of a sub-problem in a composite constraint problem. A "generic instance" is an instance that is not identifiable to the user. An "identifiable instance" is an instance that has been configured. A user may configure an instance by performing one or more actions on the instance, including explicitly adding the instance to an instance set, naming the instance, or setting properties of the instance.

In one embodiment, an "instance set" is a group or collection of component instances. The relationship type can be: Composition—Component Set or Association—Connector Set. The minimum and maximum number of set members can be: 1..1—Mandatory single; 0..1—Optional single; or n..m—Multi-instantiable.

In one embodiment, an instance set's cardinality is the number of elements in the set. A set's cardinality is constrained by the minimum and maximum number of elements specified in the set's definition. A set's cardinality may be further constrained by model constraints and user selections. For example, in a model of a mobile telephone plan, the selection "Shared Plan" implies that the cardinality of the set Phone Lines is greater than 1 (i.e., that there are at least two phone lines in the plan). Table 1 below describes the opera tions that can occur directly on a set or on component instances in a set in one embodiment:

TABLE 1

| Operations | Description |
| --- | --- |
| Add | Increase the minimum cardinality of a set by 1, adding a new or candidate instance. |
| Remove | Remove an instance from the set, making no claim on what the minimum or maximum cardinality should be. The min and max would be dictated by other constraints, such as actual instances in the set, external constraints on the set and the set definition min and max. |
| Delete | Delete an instance, removing it from that set and asserting that the maximum cardinality be one less then the previous min. |
| Configure | Configure an instance in one of three possible ways: (1) The user gestures to configure a non-placeholder instance, in which case the user gets to continue configuring the instance that is already present; (2) The user gestures to configure a placeholder instance, and chooses to contain and configure an existing candidate; and (3) The user gestures to configure a placeholder instance, and chooses to contain and configure a brand new instance. |

In addition to the direct operations, other activity can impact the set cardinality due to constraints. For example, the setting of other values in the model can cause changes in the minimum cardinality of the set.

Figure 7:
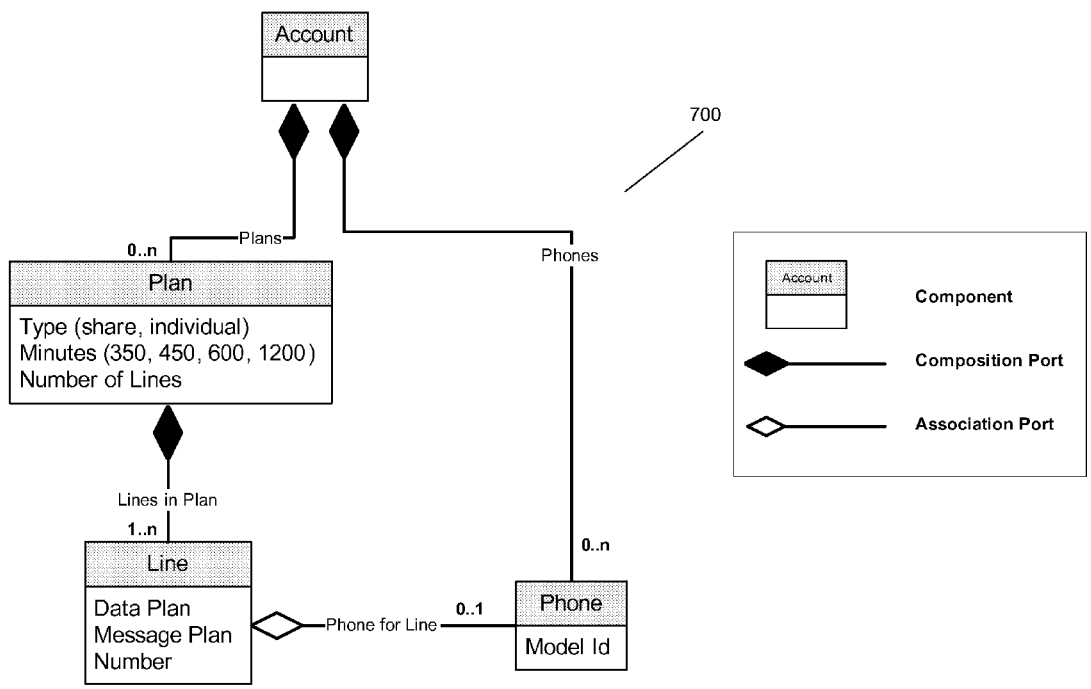
FIG. 7 illustrates an example model of a wireless telephone service plan that can be configured through user interaction with the solver in accordance with one embodiment.

FIG. 7 illustrates an example model 700 of a wireless telephone service plan that can be configured through user interaction with solver 16 in accordance with one embodiment. For model 700, an account has zero or more phones, zero or more plans, and specifies the number of lines in the plan. A plan has one or more lines, and is either shared or individual. If shared, the plan must have at least two lines. If individual, the plan can only have one line. A line is assigned to a phone. In this example model 700, there are two constraints on the number of lines in a plan: a shared plan has two or more lines; and, if specified, the "Number Of Lines" specifies the number of lines in the plan.

Figure 8:
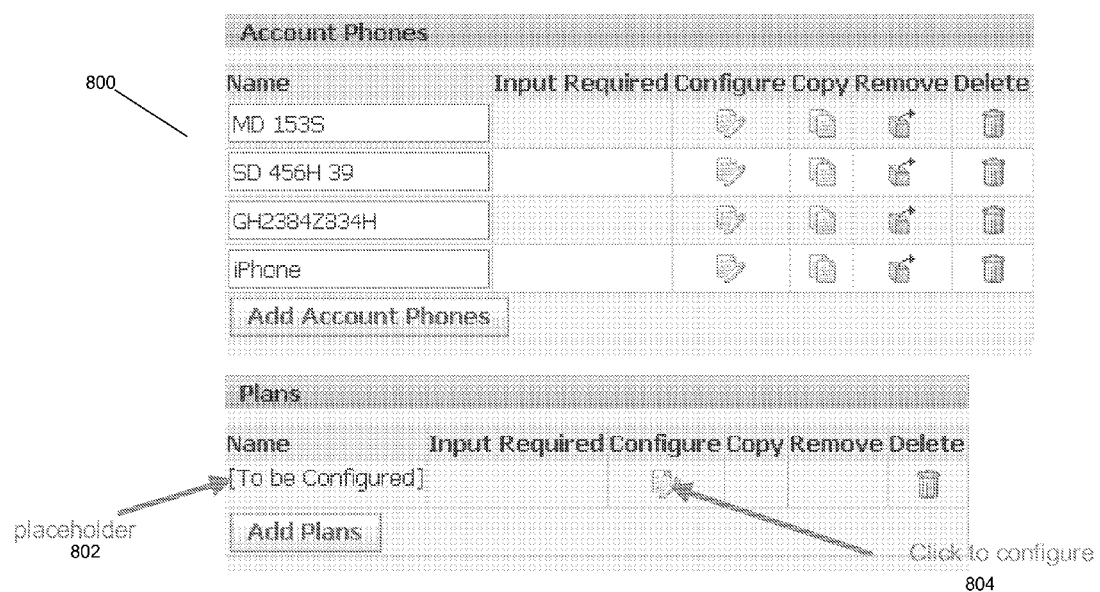
FIG. 8 is a user interface in accordance with one embodiment used to configure a wireless telephone plan in accordance with a model.

FIG. 8 is a user interface ("UI") 800 in accordance with one embodiment used to configure a wireless telephone plan in accordance with model 700. Initially, four account phones have been configured, but no plans have been configured. Since the minimum cardinality in model 700 for a plan is one (i.e., at least one plan must be configured), a placeholder 802 reflects the minimum cardinality and illustrates to the user that an instance of a plan must be configured. The user can select a configure icon 804 to configure the plan (i.e., choose an already configured plan or configure a new plan).

Figure 9:
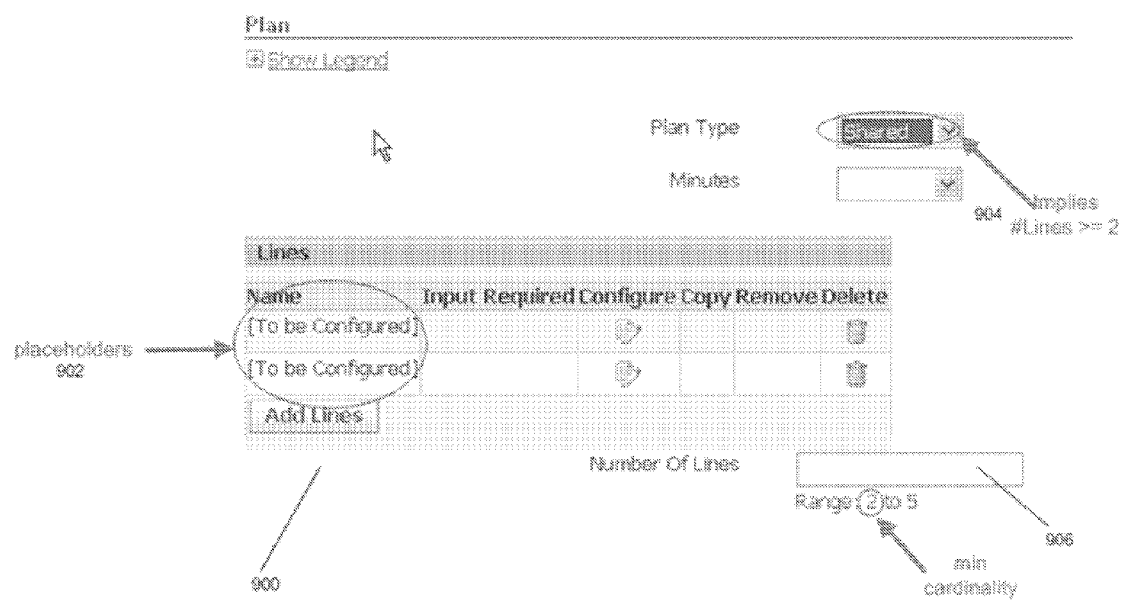
FIG. 9 is a user interface in accordance with one embodiment used to configure the lines for the plan.

FIG. 9 is a user interface ("UI") 900 in accordance with one embodiment used to configure the lines for the plan. At 904, the plan type can be selected. In the example of FIG. 9, a "shared" plan is selected. By default, this causes the number of lines in the plan to be ≧2. To represent this minimum, placeholders 902 are added to the lines table, and the cardinality is shown adjacent to field 906. Field 906 allows the user to specify the number of lines, which would affect/dictate the cardinality.

FIG. 10 is a user interface ("UI") 1000 in accordance with one embodiment used to configure the lines for the plan. UI 1000 is the same UI as UI 900 but in a different state. As shown in UI 1000, two lines have been configured. In addition, the user has entered a 3 in field 906. This causes the cardinality of the number of lines to equal 3, and causes another placeholder 1002 to be generated to reflect the new cardinality. The user can then configure the third line by selecting the configure icon 1012 for placeholder 1002.

Figure 11:
FIG. 11 is a user interface illustrating a warning in accordance with one embodiment.

Because the user entered a 3 in field 906 in UI 1000, the cardinality of the set is constrained to 3. Therefore, if after the user has configured all three lines, and the user then removes one of the lines through, for example, remove icon 1008, that line will be replaced by a placeholder. However, if the user attempts to delete one of the lines through a delete icon 1010, solver 16 will generate a warning since the user is attempting to set the number of lines to 2, which is less than the cardinality of 3. FIG. 11 is a UI 1100 illustrating a warning in accordance with one embodiment. The warning specifies that deleting the line will undo the user constraint of setting the number of lines to 3 in field 906.

FIG. 12 is a UI 1200 of the line configuration in accordance with one embodiment if the user accepts the override by clicking on "OK" in FIG. 11. Since the plan type is "Shared", the minimum cardinality of the set is ≧2. The placeholder remains to reflect this new minimum cardinality. Since the minimum is 2 based on the plan type and the maximum is 2 due to the delete, the cardinality is bound to 2 in field 906. The user may set the cardinality to 1 in field 906, thus overriding the constraint of 2 or more from selecting a shared plan and the plan would revert to an individual plan. At this point, the placeholder from FIG. 12 will go away since the minimum cardinality is now 1 and one line has already been configured.

Figure 13:
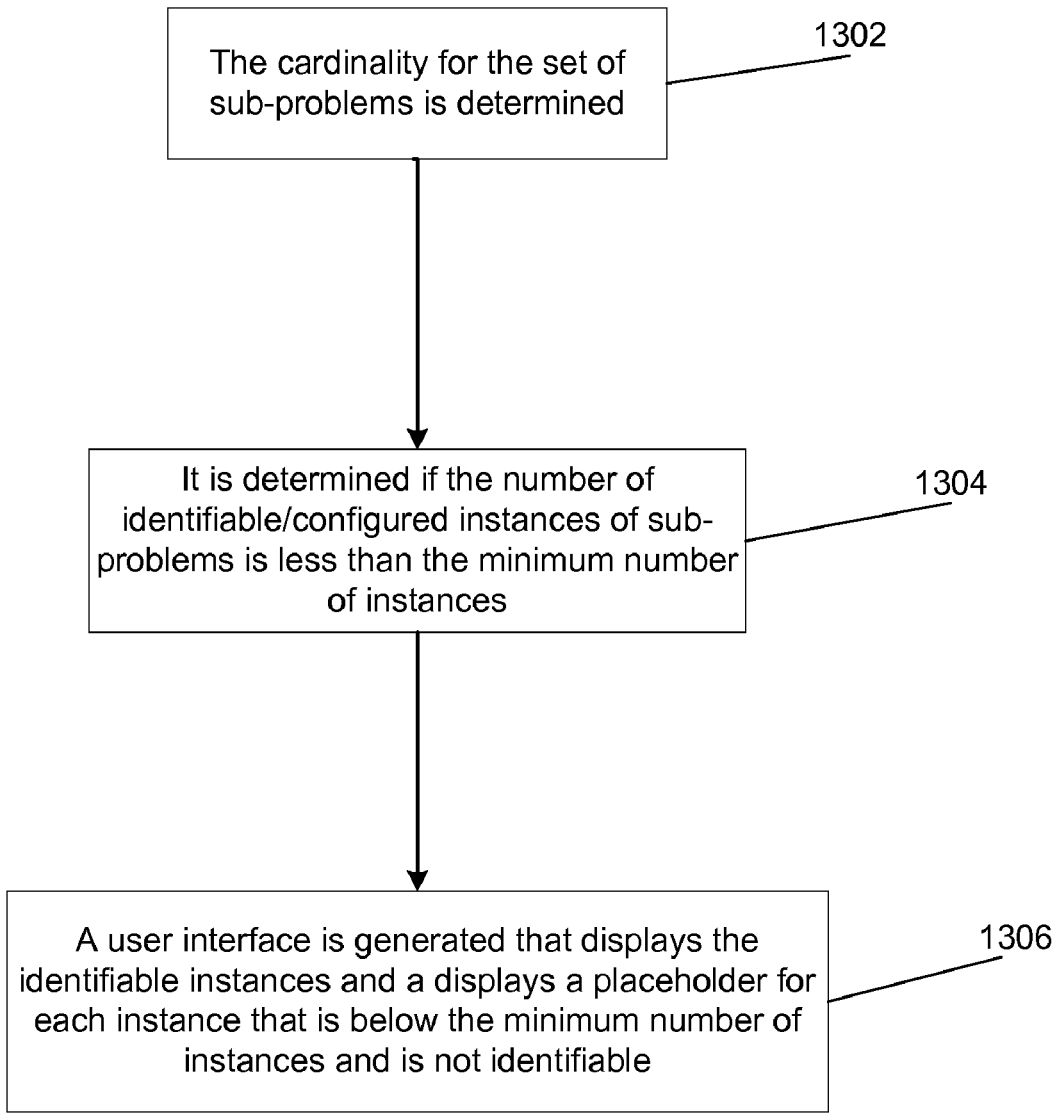
FIG. 13 is a flow diagram of the functionality of the dynamic constraint solver module when generating a user interface for an interactive user when configuring instances in a set of sub-problems in accordance with one embodiment.

FIG. 13 is a flow diagram of the functionality of dynamic constraint solver module 16 when displaying a user interface for an interactive user when configuring instances in a set of sub-problems in accordance with one embodiment. In one embodiment, the functionality of the flow diagram of FIG. 13 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1302, the cardinality for the set of sub-problems is determined. The cardinality specifies a minimum number of instances and a maximum number of instances. In situations where the cardinality is a single number (e.g., two instances), the minimum and maximum are the same number.

At 1304, it is determined if the number of identifiable/configured instances of sub-problems is less than the minimum number of instances.

At 1306, a user interface is displayed that shows the identifiable instances and displays a placeholder for each instance that is below the minimum number of instances and is not identifiable. Therefore, the interactive user will be informed how many additional instances must be configured before a viable solution to the problem is formed.

As disclosed, a solver in accordance with one embodiment determines whether more sub-problems must be configured in order to meet the minimum number of sub-problem instances required by a set constraint. In order to inform the user and to allow the user to interactively configure required sub-problems, a user interface is displayed that includes a placeholder for each required sub-problem. The user can then select the placeholder and configure the required sub-problem, either by selecting an already configured instance or configuring a new instance. The user interface also allows a user to specify/dictate the cardinality of the set, thereby potentially creating additional placeholders.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to function as a dynamic constraint solver for solving a constraint satisfaction problem that comprises a plurality of nodes and a plurality of constraints, the solving comprising:
   determining a cardinality for a set of sub-problems that are associated with a problem, wherein the cardinality comprises a minimum number of instances of each sub-problem of the set of sub-problems;
   determining if a number of identifiable instances of sub-problems is less than the minimum number of instances; and
   displaying a user interface that displays the identifiable instances and a placeholder for each instance that is below the minimum number of instances and is not identifiable, wherein each placeholder informs a user that an additional instance of the sub-problem needs to be configured to solve the constraint satisfaction problem.

2. The computer readable medium of claim 1, wherein the user interface comprises a field for receiving the cardinality of the set.

3. The computer readable medium of claim 2, further comprising repeating the determining if a number of identifiable instances of sub-problems is less than the minimum number of instances after receiving the cardinality in the field.

4. The computer readable medium of claim 1, wherein the dynamic constraint solver is a configurator and the sub-problems are components of a configuration.

5. The computer readable medium of claim 1, wherein the user interface further comprises a selection for configuring an instance corresponding to each placeholder.

6. The computer readable medium of claim 5, wherein the configuring the instance comprises creating a new instance.

7. The computer readable medium of claim 5, wherein the configuring the instance comprises choosing a previously configured instance.

8. The computer readable medium media of claim 2, further comprising generating a warning in response to an attempt to override the cardinality.

9. A computer system for solving a constraint satisfaction problem comprising problems and sub-problems, the system comprising:
   a processor;
   a computer-readable medium coupled to the processor and storing instructions that when executed by the processor generate:
   a module for tracking a cardinality for a set of sub-problems that are associated with a problem, wherein the cardinality comprises a minimum number of instances of each sub-problem of the set of sub-problems; and
   a user interface comprising a listing of identifiable instances of sub-problems for the set and at least one placeholder for each instance of sub-problems for the set that is not identifiable and is below the minimum number of instances wherein each placeholder informs a user that an additional instance of the sub-problem needs to be configured to solve the constraint satisfaction problem.

10. The computer system of claim 9, wherein the user interface comprises a field for receiving the cardinality of the set.

11. The computer system of claim 9, wherein the user interface further comprises a selection for configuring an instance corresponding to each placeholder.

12. The computer system of claim 10, further comprising repeating the determining if a number of identifiable instances of sub-problems is less than the minimum number of instances after receiving the cardinality in the field.

13. The computer system of claim 9, wherein the system is a configurator and the sub-problems are components of a configuration.

14. The computer system of claim 11, wherein the configuring the instance comprises creating a new instance.

15. A computer implemented method of solving a constraint satisfaction problem comprising:
   storing a constraint satisfaction problem network that comprises a set of sub-problems that are associated with a problem having a cardinality that comprises a minimum number of instances of each sub-problem of the set of sub-problems;
   determining a number of identifiable instances of the sub-problems; and
   if the number of identifiable instances is less than the minimum number of instances, causing a user interface to display a listing of the identifiable instances and at least one placeholder for each instance of sub-problems for the set that is not identifiable and is below the minimum number of instances, wherein each placeholder informs a user that an additional instance of the sub-problem needs to be configured to solve the constraint satisfaction problem.

16. The computer implemented method of claim 15, wherein the user interface further comprises a selection for configuring an instance corresponding to each placeholder.

17. The computer implemented method of claim 16, wherein the configuring the instance comprises creating a new instance.

18. The computer implemented method of claim 16, wherein the configuring the instance comprises choosing a previously configured instance.

19. The computer implemented method of claim 12, wherein the user interface comprises a field for receiving the cardinality of the set, further comprising repeating the determining if a number of identifiable instances of sub-problems is less than the minimum number of instances after receiving the cardinality in the field.

20. The computer implemented method of claim 15, wherein the solving is a configurator and the sub-problems are components of a configuration.

* * * * *

UNITED STATES PATENT AND TRADEMARK OFFICE
CERTIFICATE OF CORRECTION

PATENT NO.        : 8,301,582 B2
APPLICATION NO.   : 12/579850
DATED             : October 30, 2012
INVENTOR(S)       : Huberman et al.

Page 1 of 1

It is certified that error appears in the above-identified patent and that said Letters Patent is hereby corrected as shown below:

On title page, in column 2, under "Other Publications", line 10, delete "pp.. E." and insert -- pp. --, therefor.

In the claims,

In column 9, line 48, in Claim 8, delete "medium media" and insert -- medium --, therefor.

In column 10, line 5, in Claim 9, delete "instances" and insert -- instances, --, therefor.

In column 10, line 51, in Claim 19, delete "claim 12," and insert -- claim 15, --, therefor.

Signed and Sealed this
Twenty-second Day of September, 2015

Michelle K. Lee
*Director of the United States Patent and Trademark Office*